United States Patent
Lang et al.

(10) Patent No.: US 10,458,551 B2
(45) Date of Patent: Oct. 29, 2019

(54) SEALING ASSEMBLY AND METHOD FOR MONITORING A SEALING ASSEMBLY

(71) Applicants: Aktiebolaget SKF, Gothenburg (SE); SKF Economos Deutschland GmbH, Bietigheim-Bissingen (DE)

(72) Inventors: Defeng Lang, Delft (NL); Muhammad Ahmer, Gothenburg (SE); Thomas Deigner, Lauffen (DE); Jos Holsnijders, Leerdam (NL); Sebastian Ziegler, Bamberg (DE); Frank de Wit, Noordeloos (NL); Hans-Joachim vom Stein, Odenthal (DE)

(73) Assignees: Aktiebolaget SKF, Göteborg (SE); SKF Economos Deutschland GmbH, Bietigheim-Bissingen (DE)

( * ) Notice: Subject to any disclaimer, the term of this patent is extended or adjusted under 35 U.S.C. 154(b) by 164 days.

(21) Appl. No.: 15/531,161

(22) PCT Filed: Nov. 23, 2015

(86) PCT No.: PCT/EP2015/077359
§ 371 (c)(1),
(2) Date: May 26, 2017

(87) PCT Pub. No.: WO2016/083299
PCT Pub. Date: Jun. 2, 2016

(65) Prior Publication Data
US 2018/0283557 A1    Oct. 4, 2018

(30) Foreign Application Priority Data
Nov. 27, 2014 (GB) .................................. 1421049.6

(51) Int. Cl.
*F16J 15/3296* (2016.01)

(52) U.S. Cl.
CPC ................................ *F16J 15/3296* (2013.01)

(58) Field of Classification Search
CPC . F16J 15/3296; F16C 19/527; F16C 33/7856; F16C 41/10; F16C 2233/00; G01M 13/005; G01M 13/045
(Continued)

(56) References Cited

U.S. PATENT DOCUMENTS

| 4,748,850 A | 6/1988 | Kataoka |
| 5,648,614 A | 7/1997 | Martsfeld |

(Continued)

FOREIGN PATENT DOCUMENTS

| CN | 1094136 A | 10/1994 |
| CN | 1380499 A | 11/2002 |

(Continued)

OTHER PUBLICATIONS

Accelerometer and friction, Erdogan, (Year: 2010).*
Accelerometer and Friction, Endogan, (Year: 2010).

*Primary Examiner* — Nathan Cumar
(74) *Attorney, Agent, or Firm* — Bryan Peckjian; SKF USA Inc. Patent Dept.

(57) ABSTRACT

A sealing assembly including an elastic seal lip having a movable part is provided. The seal lip is configured to be attached to a first part of a machine and to be in contact with a second part of the machine. At least one acceleration sensor is fixed to the movable part of the seal lip, and that assembly further includes a data processing device for processing data obtained from the acceleration sensor. The data processing device is configured to determine the orientation of the acceleration sensor in relation to the direction of gravity.

11 Claims, 1 Drawing Sheet

(58) Field of Classification Search
USPC .................................................. 277/317
See application file for complete search history.

(56) References Cited

U.S. PATENT DOCUMENTS

| | | | |
|---|---|---|---|
| 6,003,872 A | 12/1999 | Nord | |
| 6,237,403 B1 | 5/2001 | Oldenettel | |
| 6,672,681 B1 | 1/2004 | Moretti | |
| 8,966,978 B2 | 3/2015 | Pannek | |
| 9,714,883 B2 | 7/2017 | Lee | |
| 9,958,345 B2 | 5/2018 | Ichikawa | |
| 9,960,641 B2 | 5/2018 | Ichikawa | |
| 2002/0051593 A1* | 5/2002 | Oka | F16C 19/386 384/448 |
| 2003/0042890 A1 | 3/2003 | Normann | |
| 2006/0006601 A1* | 1/2006 | Hufnagel | F16J 15/3228 277/317 |
| 2006/0250228 A1 | 11/2006 | Mori | |
| 2007/0059857 A1* | 3/2007 | Sooriakumar | B81B 3/0062 438/50 |
| 2009/0315267 A1 | 12/2009 | Castleman | |
| 2009/0317028 A1 | 12/2009 | Castleman | |
| 2010/0010770 A1 | 1/2010 | Helck | |
| 2010/0039381 A1* | 2/2010 | Cretella, Jr. | G06F 3/0317 345/158 |
| 2010/0074567 A1 | 3/2010 | Giordana | |
| 2010/0135604 A1 | 6/2010 | Ozaki | |
| 2010/0307218 A1 | 12/2010 | Meuter | |
| 2011/0103690 A1* | 5/2011 | Napper | G06K 9/00409 382/188 |
| 2012/0042727 A1 | 2/2012 | Egedal | |
| 2012/0210791 A1 | 8/2012 | Pannek | |
| 2013/0305842 A1 | 11/2013 | Meuter | |
| 2014/0049008 A1 | 2/2014 | Ziegler | |
| 2015/0273325 A1 | 10/2015 | Raic | |
| 2016/0123470 A1 | 5/2016 | Glaentz | |
| 2017/0030804 A1 | 2/2017 | De Wit | |
| 2017/0322095 A1 | 11/2017 | Lang | |
| 2018/0149205 A1 | 5/2018 | Den Haak | |
| 2018/0266265 A1 | 9/2018 | Gerbi | |
| 2018/0283557 A1 | 10/2018 | Lang | |

FOREIGN PATENT DOCUMENTS

| | | |
|---|---|---|
| CN | 1414349 A | 4/2003 |
| CN | 1723385 A | 1/2006 |
| CN | 1748091 A | 3/2006 |
| CN | 1853061 A | 10/2006 |
| CN | 101166912 A | 4/2008 |
| CN | 101175926 A | 5/2008 |
| CN | 101238302 A | 8/2008 |
| CN | 101292090 A | 10/2008 |
| CN | 101326431 A | 12/2008 |
| CN | 101400979 A | 4/2009 |
| CN | 102036869 A | 4/2011 |
| CN | 103097755 A | 5/2013 |
| DE | 102006060382 A1 | 6/2008 |
| DE | 102013208209 A1 | 11/2014 |
| EP | 0517082 A2 | 12/1992 |
| JP | 2006300702 A | 11/2006 |
| JP | 2009236821 A | 10/2009 |
| JP | 2012149716 A | 8/2012 |
| JP | 2012179928 A | 9/2012 |
| WO | 8304436 A1 | 12/1983 |
| WO | 2011069519 A1 | 6/2011 |
| WO | 2012098980 A1 | 7/2012 |
| WO | 2013000865 A1 | 1/2013 |
| WO | 2013104426 A1 | 7/2013 |

* cited by examiner

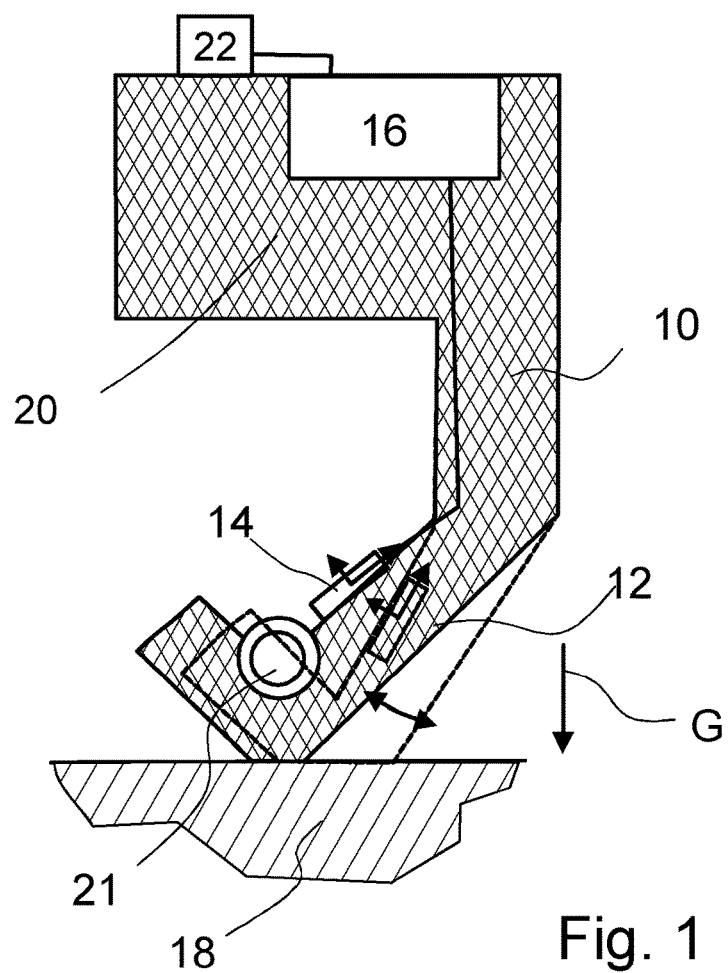
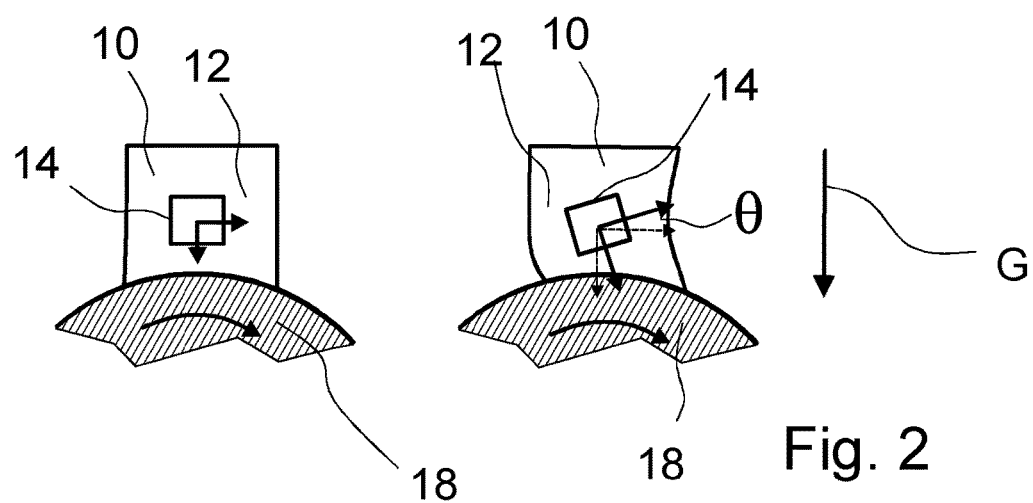

SEALING ASSEMBLY AND METHOD FOR MONITORING A SEALING ASSEMBLY

CROSS REFERENCE

This is a United States National Stage Application claiming the benefit of International Application Number PCT/EP2015/077359 filed on Nov. 23, 2015, which claims the benefit of British Patent Application 1421049.6 filed on Nov. 27, 2014, both of which are incorporated herein by reference in their entireties.

BACKGROUND OF THE INVENTION

Bearings are often used as critical parts in complex machines and bearing failure may lead to major damages. Replacing bearings may be complicated and results in downtime. The bearing lifetime strongly depends on the quality of the lubrication and of the seals. Monitoring the quality of the seals and of the lubrication is therefore highly desirable.

The progress in mobile telecommunication technology has brought about a new generation of semiconductor-based accelerometers for use in smartphones which are highly miniaturized.

BRIEF SUMMARY OF THE INVENTION

The invention seeks to provide a sealing assembly with means for monitoring its function in a reliable way.

The invention starts from a sealing assembly including an elastic seal lip having a movable part, wherein said seal lip is configured to be attached to a first part of a machine and to be in sliding contact with a second part of the machine.

It is proposed that at least one acceleration sensor is fixed to the movable part of the seal lip. Accelerometers or acceleration sensors are available in high quality at a low price on the market. While the technical prejudice that the integration of sensors into sealing lips is difficult still exists in the field of bearing seals or other sealing assemblies, the inventors have surprisingly found that the miniaturization and robustness of this class of sensors is sufficiently advanced to open this new field of applications.

While the invention may be applied to applications with linear motion between the first part and the second part as well, it is preferred that the first part of a machine and the second part of the machine are bearing rings. In alternative embodiments, the rotating part could be a shaft. According to a further aspect of the invention, the movable part of the seal lip has an inclined portion extending from a seal body toward a sliding contact surface of the second part of the machine, wherein the acceleration sensor is attached to the inclined portion. The inclination of the inclined portion is likely to change as a consequence of wear or dynamic forces acting on the seal such that this position is suitable for measuring characteristic motions of the seal lip. Further, the inclined portion is often large enough to enable a reliable fixation of the sensor.

In a preferred embodiment of the invention, the acceleration sensor is formed as a 3-axis gravity sensor semiconductor chip.

The assembly further includes a data processing device for processing data obtained from the acceleration sensor, wherein the data processing device is configured to determine the orientation of the acceleration sensor in relation to the direction of gravity. The data processing device may be included in a sensor pack containing the acceleration sensor for large-size sealing lips, attached to a ring of the bearing or located in a remote control unit of a machine including the bearing.

In a preferred embodiment of the invention, the data processing device is further configured to calculate a parameter indicating wear of the sealing lip from the orientation of the acceleration sensor. In most seal geometries with sliding contact, the inclination angle of the seal increases with increasing wear. The orientation of the movable portion of the seal lip is therefore a reliable indicator for wear. The data processing device preferably stores the original orientation of the new seal lip and compares the measured orientation with the original orientation.

In a further embodiment, the data processing device may be additionally configured to calculate a parameter indicating a stiction of the sealing lip from the orientation of the acceleration sensor.

It is further proposed that the data processing device is configured to derive at least one parameter describing a dynamic behavior of the sealing assembly and its lubrication from the data obtained from the acceleration sensor. In particular, the data processing device may be configured to evaluate an amplitude and/or spectrum of vibrations of the seal lip from the data obtained from the acceleration sensor and to issue a warning signal if the amplitude and/or spectrum of vibrations meets a set of predetermined criteria.

Further aspects of the invention relate to a bearing including a seal assembly as described above and to a machine including such a bearing.

A yet further aspect of the invention relates to a method for monitoring a sealing assembly including an elastic seal lip having a movable part, wherein said seal lip is configured to be attached to a first part of a machine and to be in sliding contact with a second part of the machine.

It is proposed that the method includes evaluating the signals of at least one acceleration sensor which is fixed to the movable part of the seal lip.

The inclusion of a 3D acceleration sensor on the seal-lip for measuring shaft vibration, run-out, etc., has a pleasant side effect, namely, as it is a DC sensor it can measure the earth's gravity field. If the seal lip is in a position that seal lip wear causes a change of angle of the sensor (which is likely in most machines) this causes a change (via the arcsine of the angle between sensor and gravity vector) in the sensor offset which can be measured.

The preferred embodiment works on the measurement of the gravity vector as it acts on the nano-scale structures of a 3D acceleration chip. When the seal lip wears out, its angle towards the body material changes. The connection between seal lip and seal body acts as a hinge. The sensor is also rotated and with it the sensitive surface. Depending on sensor orientation, none, one or more of the surfaces undergo a rotation and the rotation leads in a different offset for the surface. Given the set of offsets corresponding to the original orientation and the typical lack of drift of the sensor itself, over time a change in the vectors can be measured as the seal lip wears out. Given the seal geometry this change can be calculated back to seal lip wear. The invention works for both, rotation applications and linear motion applications.

The following non-limiting description of embodiments of the invention as well as the appended claims and Figures show multiple characterizing features of the invention in specific combinations. The skilled person will easily be able to consider further combinations or sub-combinations of these features in order to adapt the invention as defined in the claims to his or her specific needs.

BRIEF DESCRIPTION OF THE SEVERAL VIEWS OF THE DRAWING

FIG. 1 illustrates a sealing assembly according to the invention in a sectional view; and FIG. 2 illustrates a sealing assembly according to the invention in an axial view.

DETAILED DESCRIPTION OF THE INVENTION

FIG. 1 illustrates a sealing assembly including an elastic seal lip 10 having a movable part 12, wherein said seal lip 10 is configured to be attached to a first part of a machine formed as a non-rotating ring of a bearing or a housing (not shown) and to be in sliding contact with a second part 18 of the machine formed as a rotating shaft or as a rotating ring of the bearing.

The sealing assembly comprises a rubber ring with a profile as illustrated in FIG. 1. The ring includes a seal body 20 and a seal lip 10 protruding radially from the seal body 20. The seal lip 10 has a radial portion and an inclined portion connected to the radial portion by a rotation hinge. The seal lip 10 may optionally be preloaded to the surface of the inner ring by a garter spring 21.

An acceleration sensor 14 formed as a 3-axis semiconductor-based gravity sensor 14 is fixed to the inclined portion which constitutes the movable part 12 of the seal lip 10 on a side facing the seal body 20. A data processing device 16 reads out the signals of the acceleration sensor 14 and evaluates the signals as described in further detail below. The direction of gravity G is indicated with an arrow and the sensor is configured to output the components of the gravity acceleration as the DC part of its signal.

The inclined portion extends from the seal body 20 toward a sliding contact surface of the rotating ring. The seal lip 10 is pressed onto the sliding contact surface by a ring.

The dashed lines in FIG. 1 show the configuration of the seal lip 10 when the latter is worn out. The inclination of the inclined portion changes as a consequence of wear. The sensor 14 is also rotated and, together with it, the sensitive surfaces of the sensor. Depending on sensor 14 orientation, none, one or more of the surfaces undergo a rotation and this rotation leads to a difference in the offset signal for the surface corresponding to the changing components of the gravitational acceleration. Over time a change in the vectors can be measured as the seal lip 10 wears out. Given the seal geometry, this change can be calculated back to seal lip 10 wear by the data processing device 16, which may output or store the values of the wear and/or issue warning signals if the wear reaches a critical threshold. In embodiments where a further gravitation sensor 14 is mounted on a non-moving part of the machine or of the bearing, it is possible to monitor relative changes of the orientation of the seal lip 10. In both cases, the data processing device 16 is configured to determine the orientation of the acceleration sensor 14 in relation to the direction of gravity and to calculate a parameter indicating wear of the sealing lip from the orientation of the acceleration sensor 14.

FIG. 2 illustrates an embodiment where the data processing device 16 is configured to calculate a parameter indicating a stiction of the sealing lip from the orientation of the acceleration sensor 14.

The stiction causes a deformation of the seal in the direction of rotation. The solid lines in FIG. 2 show a configuration of a portion of the seal lip 10 with low stiction and the dashed lines show the stiction deformation for higher friction. The deformation is a torsional strain deformation wherein the radially inner part of the seal lip 10 is rotationally deflected with respect to its radially outer portion.

The acceleration sensor 14 is mounted on the seal such that it can sense vibration (AC) and rotation of the shaft (DC). The rotation angle θ will be in the signal of the measured tangential and radial components. A calibrated x, y, z to polar translation has been demonstrated to be able to convert the sensor 14 signals into usable bearing shaft coordinates. The rotational component tells us about the amount of stiction of the seal to the shaft. The same principle can also be used in torque and/or load sensing. Of course, in that case it would not be a shaft/seal combination, but something static like an arm that is bent, and as such changes its angle with respect to the earth's gravitational vector.

While the embodiments above focus on the DC part of the sensor 14 signal, it is possible to retrieve information on dynamic forces acting on the seal by using the AC component of the signal.

Possible embodiments of the invention include embodiments where the data processing device 16 is configured to derive at least one parameter describing a dynamic behavior of the sealing assembly and its lubrication from the data obtained from the acceleration sensor 14. In particular, the data processing device 16 may be configured to evaluate an amplitude and/or a spectrum of vibrations of the seal lip 10 from the data obtained from the acceleration sensor 14 and to issue a warning signal if the amplitude and/or the spectrum of vibrations meets a set of predetermined criteria.

Embodiments of the last mentioned type will be described in the following. The features of all of the embodiments may easily be combined in the sense that the data processing device 16 determines multiple parameters relating to different aspects of the static and dynamic behavior of the sealing.

In one embodiment of the invention, the data processing device 16 is configured to measure the aging of the seal over time. Aging changes the damping and resonance frequency. The data processing device 16 may determine how the seal lip 10 moves in response to a shock or impulse occurring, e.g., each time when the machine is starting. In one embodiment of the invention, the data processing device 16 is configured to check the seal condition and lip contact with a defined shock wave input, e.g., by the ignition of the combustion engine at each stroke or other defined input. Measuring an impulse response function is normally done with an artificial impulse. Making use of impulses of the application (in a certain time frame) which periodically occur, a frequency response function can be calculated. For example in a crankshaft seal of a combustion engine (marine). This signal can also be used for other parameter checks of the application. A frequency response function coupled to the temperature might be used to calculate damping (related to lubrication), stiffening (related to aging).

Certain applications have events which occur several times during a certain time period; for example a ramp-up of speed during a start-up. This event can be monitored by the acceleration sensor 14. The start-up can be considered as a speed ramp. Measuring the acceleration (3DOF) during this ramp-up gives information about the damping and seal (and maybe also system) resonance. A comparison of the measurements over time (during the same start-up events) can possibly give an indication of aging or wear.

In a further embodiment of the invention, the data processing device 16 is configured to determine the seal lip 10 lubrication condition by the high frequency components in the signal. The inventors have found that this lubrication condition can be detected by the signal amplitude. Lack of lubrication results in micro-mechanical contact during a very short time. This generates high frequency signals in the seal lip 10, to be measured with the accelerometer. A frequency shift (measured over a time interval) might give an indication of a bad lubrication condition.

Further, the stick-slip effect of a seal when running up or stopping will start tangential forces in the seal lip 10. The forces result in an acceleration and can then be measured by the sensor 14. This provides information about the seal lip 10 lubrication and, especially, also about wear. When the lip no longer makes contact, this signal will be lost, which can be detected.

In a further embodiment of the invention, it is proposed to use a special coded sensor 14 that sends extra information besides the data, or specific characteristic time difference between data packages, e.g., in order to identify the bearing. Today, type and size of the bearing are often shown on the seal outside. By using several accelerometers on the seal, it is possible to code the sensors 14 digitally with a code being unique for a certain bearing type. This code can be, for example, a digital code to access the sensor 14, before it can be used. In the conditioner a code can be generated which relates to the bearing ID and to the manufacturer. The format of the data transfer can also make a code which is unique for a certain bearing type.

In one embodiment of the invention, the data processing device 16 is configured to use the frequency data to sense the wear and friction condition. When friction goes up, the temperature increases such that more damping and less high-frequency components exist in the signal.

It is further proposed to generate a 3D matrix map for a certain moment in time by analysis of the rotational speed and temperature in combination with the frequency response of the accelerometers. This map can be compared with different application conditions. When measuring this map within a predefined time interval, during known application conditions, one can follow the trend of wear, friction and aging.

In a further embodiment of the invention, the data processing device 16 is configured to determine measuring the rotation speed of the seal in a rotating seal application. In a rotating seal application, the sensor 14 can measure the rotation speed by using the gravity vector as a reference because the signal will be oscillating with the rotation frequency.

In a further embodiment of the invention, the data processing device 16 is configured to record the start and stop time stamp, frequency, and calculate the actual running time. Via a threshold or pattern recognition function it can be detected that the bearing is running. This information, when integrated, will tell about the total runtime of the seal, and, when coupled to a timestamp, can be combined with the information from other sensors 14 on the total system.

In a further embodiment of the invention, the data processing device 16 is configured to record the abuse of the seal, e.g. large dynamic run-out; or in combination with a temperature sensor 14 the starting condition can be recorded. The inventors propose to include this function on the acceleration chip itself in order to prevent tampering. A large vibration lasting more than a certain period will trigger a destructive write process to a memory cell.

In a further embodiment of the invention, the data processing device 16 is configured to detect loss of preload of the bearing, which results in an increased axial vibration. This can be measured as a break in a trend. Loss of preload makes the axial forces on the shaft have a direct 1:1 coupling to the shaft mass. There is no longer the stiffness of the bearing to dampen the movement. Through the friction of the seal lip 10 this acceleration will be immediately transferred to the sensor 14.

In a further development, the data processing device 16 may be configured to detect a damage of a labyrinth seal by detecting contact vibration of a seal which should not contact the shaft normally. In a labyrinth seal the contact of the labyrinth walls from the static part to the rotating part has to be avoided as it will lead to excessive wear. The contacting introduces forces, and from the forces there follows an acceleration. As the static seal wall acts as a brake, the deceleration on the rotating wall can be directly measured with the sensor 14. Given the short duration, this is a clear break from the trend. For this further development, the acceleration sensor 14 may be fixed to a seal lip 10 which is not designed to be in sliding contact with a second part 18 of the machine, but happens to establish sliding contact as a result of damage or wear.

The invention is not limited to seals with radial contact but can be applied to face seals in order to measure the axial movement. A face seal provides sealing in the axial direction.

In a further embodiment of the invention, the data processing device 16 is configured to detect a pumping effect of the seal by way of detecting certain axial and radial vibration patterns. The pumping action of the seal results in a repeated characteristic sinusoidal motion, which is relatively fast and coupled to the rotation speed, and, thus, in a detectable specific acceleration signal pattern.

In a further embodiment of the invention, the data processing device 16 is configured to measure the flat spot or imperfection of the tire, in truck or automotive applications. A flat spot on a tire results in two shocks transferred through the tire to the rim and then to the hub. From the hub it moves to the shaft and then to the bearing. There will be some dampening by the tire, but the metal masses are fairly stiff. The signal will arrive at the shaft and cause two consecutive unique radial force pulses that are transmitted into the seal lip 10. Again, this pattern deviates from the trend and can be detected.

The data processing device 16 implements a method for monitoring a sealing assembly including an elastic seal lip 10 having a movable part 12, wherein said seal lip 10 is configured to be attached to a first part of a machine and to be in sliding contact with a second part 18 of the machine. The method includes evaluating the signals of at least one acceleration sensor 14, which is fixed to the movable part 12 of the seal lip 10.

The invention claimed is:

1. A sealing assembly comprising:
   an elastic seal lip having a movable part, the seal lip being configured to be attached to a first part of a machine and to be in contact with a second part of the machine, at least one acceleration sensor fixed to the movable part of the seal lip, and
   a data processing device for processing data obtained from the acceleration sensor,
   wherein the data processing device is configured to:
   a) determine an angle of the seal lip in relation to the direction of gravity at a first time;
   b) determine an angle of the seal lip in relation to the direction of gravity at a subsequent time;
   c) determine a difference between the angle of the seal lip in relation to gravity at the subsequent time and the angle of the seal lip in relation to gravity at the first time; and d) if the difference is less than a predetermined value, repeat steps a through d and if the difference exceeds a predetermined value, produce a signal indicative of a worn seal or a signal indicative of higher-than normal stiction.

2. The sealing assembly according to claim 1, wherein the first part of a machine and the second part of the machine are bearing rings.

3. The sealing assembly according to claim 1,
wherein the movable part of the seal lip has an inclined portion extending from a seal body toward a sliding contact surface of the second part of the machine, wherein the acceleration sensor is attached to the inclined portion.

4. The sealing assembly according to claim 1,
wherein the acceleration sensor is formed as a 3-axis gravity sensor semiconductor chip.

5. The sealing assembly according to claim 1, wherein the data processing device is configured to derive at least one parameter describing a dynamic behavior of the sealing assembly and its lubrication from the data obtained from the acceleration sensor.

6. The sealing assembly according to claim 5,
wherein the data processing device is configured to evaluate an amplitude and/or spectrum of vibrations of the seal lip from the data obtained from the acceleration sensor and to issue a warning signal if the amplitude and/or spectrum of vibrations meets a set of predetermined criteria.

7. A bearing comprising:
the sealing assembly according to claim 1.

8. A method for monitoring a sealing assembly including an elastic seal lip having a movable part, the seal lip being configured to be attached to a first part of a machine and to be in sliding contact with a second part of the machine, the method comprising:
evaluating the signals of at least one acceleration sensor fixed to the movable part of the seal lip, determining wear of the seal lip or stiction of the seal lip from the evaluated signals,
wherein determining the wear of the seal lip or stiction of the seal lip comprises:
a) measuring an orientation of the seal lip at a first time;
b) measuring an orientation of the seal lip at a subsequent time;
c) determining a difference between the orientation of the seal lip at the subsequent time and the orientation of the seal lip at the first time; and
d) if the difference is less than a predetermined value, repeating steps a through d and if the difference exceeds a predetermined value, producing a signal indicative of a worn seal or a signal indicative of higher-than-normal stiction.

9. The method of claim 8,
wherein the acceleration sensor is a 3-axis gravity sensor semiconductor chip configured to determine a direction of gravity, and
wherein:
a) measuring the orientation of the seal lip at the first time comprises determining an angle of the seal lip relative to the direction of gravity at the first time; and
b) measuring the orientation of the seal lip at the second time comprises determining the angle of the seal lip relative to the direction of gravity at the subsequent time.

10. The sealing assembly according to claim 1, including at least one acceleration sensor fixed to a non-moving part of the machine and operably connected to the data processing device.

11. The sealing assembly according to claim 1,
wherein the at least one acceleration sensor is a 3-axis gravity sensor semiconductor chip configured to determine a direction of gravity.

* * * * *